United States Patent
Lee et al.

(10) Patent No.: US 11,093,560 B2
(45) Date of Patent: Aug. 17, 2021

(54) STACKED CROSS-MODAL MATCHING

(71) Applicant: Microsoft Technology Licensing, LLC, Redmond, WA (US)

(72) Inventors: Kuang-Huei Lee, Redmond, WA (US); Gang Hua, Sammamish, WA (US); Xi Chen, Bellevue, WA (US); Houdong Hu, Redmond, WA (US); He Xiaodong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 16/138,587

(22) Filed: Sep. 21, 2018

(65) Prior Publication Data

US 2020/0097604 A1    Mar. 26, 2020

(51) Int. Cl.
| | | |
|---|---|---|
| *G06F 16/20* | (2019.01) | |
| *G06F 16/951* | (2019.01) | |
| *G06N 3/04* | (2006.01) | |
| *G06N 3/08* | (2006.01) | |
| *G06F 17/18* | (2006.01) | |
| *G06K 9/62* | (2006.01) | |
| *G06F 17/16* | (2006.01) | |
| *G06T 7/11* | (2017.01) | |

(52) U.S. Cl.
CPC ............ *G06F 16/951* (2019.01); *G06F 17/16* (2013.01); *G06F 17/18* (2013.01); *G06K 9/6215* (2013.01); *G06N 3/0454* (2013.01); *G06N 3/08* (2013.01); *G06T 7/11* (2017.01)

(58) Field of Classification Search
CPC ........ G06F 16/951; G06F 17/16; G06F 17/18; G06N 3/0454; G06N 3/08; G06N 3/083; G06N 3/0472; G06K 9/6215
See application file for complete search history.

(56) References Cited

U.S. PATENT DOCUMENTS

| | | | | |
|---|---|---|---|---|
| 8,538,957 B1 * | 9/2013 | Zhou | ....................... | G06F 40/51 |
| | | | | 707/728 |
| 9,454,524 B1 * | 9/2016 | Modani | ................. | G06K 9/6215 |
| 10,445,431 B1 * | 10/2019 | Lev-Tov | ................. | G06F 40/40 |

(Continued)

OTHER PUBLICATIONS

Anderson, et al., "Bottom-up and top-down attention for image captioning and VQA", In Journal of Computer Vision and Pattern Recognition Version 3, Mar. 14, 2018, 10 Pages.

(Continued)

*Primary Examiner* — Tarek Chbouki
(74) *Attorney, Agent, or Firm* — Rainier Patents, P.S.

(57) ABSTRACT

The present concepts relate to matching data of two different modalities using two stages of attention. First data is encoded as a set of first vectors representing components of the first data, and second data is encoded as a set of second vectors representing components of the second data. In the first stage, the components of the first data are attended by comparing the first vectors and the second vectors to generate a set of attended vectors. In the second stage, the components of the second data are attended by comparing the second vectors and the attended vectors to generate a plurality of relevance scores. Then, the relevance scores are pooled to calculate a similarity score that indicates a degree of similarity between the first data and the second data.

20 Claims, 8 Drawing Sheets

(56) References Cited

U.S. PATENT DOCUMENTS

| | | | | |
|---|---|---|---|---|
| 2013/0138665 | A1* | 5/2013 | Hu | G06F 16/36 |
| | | | | 707/749 |
| 2017/0061250 | A1* | 3/2017 | Gao | G06N 3/0454 |
| 2018/0082172 | A1* | 3/2018 | Patel | G06N 3/0472 |
| 2019/0035083 | A1* | 1/2019 | Lin | G10L 15/26 |
| 2019/0130221 | A1* | 5/2019 | Bose | G06K 9/6267 |
| 2020/0265327 | A1* | 8/2020 | Kwiatkowski | G06N 5/04 |
| 2021/0004605 | A1* | 1/2021 | Hsiao | G06N 3/0445 |
| 2021/0019479 | A1* | 1/2021 | Tu | G06F 40/30 |

OTHER PUBLICATIONS

Ba, et al., "Layer Normalization", Retrieved From: https://airxiv.org/abs/1607.06450, Jul. 21, 2016, 14 Pages.

Bahdanau, et al., "Neural machine translation by jointly learning to align and translate", In proceedings of International Conference on Learning Representations, May 16, 2016, 15 Pages.

Buschman, et al., "Top-down versus bottom-up control of attention in the prefrontal and posterior parietal cortices", In the Journal of Science vol. 315, Issue 5820, Mar. 30, 2007, 27 Pages.

Chorowski, et al., "Attention-based models for speech recognition", In the Journal of Advances in neural information processing systems, Jan. 2015, 9 Pages.

Corbetta, et al., "Control of Goal-Directed and Stimulus-Driven Attention in The Brain", In the Journal of Nature Reviews Neuroscience, vol. 3, Issue 3, Mar. 2015, pp. 201-215.

Deng, et al., "Imagenet: A Large-Scale Hierarchical Image Database", In Proceedings of IEEE Conference on Computer Vision and Pattern Recognition, Jan. 2009, 22 Pages.

Devlin, et al., "Language models for image captioning: The quirks and what works", In Proceedings of the 53rd Annual Meeting of the Association for Computational Linguistics and the 7th International Joint Conference on Natural Language Processing, Jan. 2015, pp. 100-105.

Eisenschtat, et al., "Linking Image and Text With 2-Way Nets", In the Proceedings of IEEE Conference on Computer Vision and Pattern Recognition (CVPR), Jul. 1, 2017, 11 Pages.

Faghri, et al., "VSE++: Improved Visual-Semantic Embeddings", Retrieved From: https://github.com/fartashf/vsepp, Jul. 18, 2017, 14 Pages.

Fang, et al. "From Captions to Visual Concepts and Back", In Proceedings of the IEEE Conference on Computer Vision and Pattern Recognition, Jan. 2015, 10 Pages.

Girshick, et al., "Rich Feature Hierarchies for Accurate Object Detection and Semantic Segmentation", In Proceedings of the IEEE Conference on Computer Vision and Pattern Recognition, Jan. 2014, 8 Pages.

Gu, et al., "Look, Imagine and Match: Improving Textual-Visual Cross-Modal Retrieval with Generative Models", In Proceedings of the IEEE Conference on Computer Vision and Pattern Recognition, Jun. 13, 2018, 9 Pages.

He, et al., "Deep Residual Learning for Image Recognition", In Proceedings of the IEEE Conference on Computer Vision and Pattern Recognition, Dec. 10, 2015, 12 Pages.

He, et al., "Discriminative Learning in Sequential Pattern Recognition", In IEEE Signal Processing Magazine, vol. 25, Issue 5, Dec. 21, 2008, pp. 14-36.

Huang, et al., "Instance-Aware Image and Sentence Matching With Selective Multimodal LSTM", In Proceedings of the IEEE Conference on Computer Vision and Pattern Recognition, vol. 2, Issue 6, Jul. 1, 2017, 9 Pages.

Huang, et al., "Learning Semantic Concepts and Order for Image and Sentence Matching", In Proceedings of the Ieee Conference on Computer Vision and Pattern Recognition, vol. 2, Jan. 2018, pp. 6163-6171.

Juang, et al., "Minimum Classification Error Rate Methods for Speech Recognition", In the Journal of IEEE Transactions on Speech and Audio processing vol. 5, Issue 3, May 1997, pp. 257-265.

Karpathy, et al., "Deep Fragment Embeddings for Bidirectional Image Sentence Mapping", In Journal of Advances in Neural Information Processing System, Jun. 22, 2014, 9 Pages.

Karpathy, et al., "Deep Visual-Semantic Alignments for Generating Image Descriptions", In Proceedings of the IEEE Conference on Computer Vision and Pattern Recognition, Jan. 2015, 17 Pages.

Katsuki, et al., "Bottom-Up and Top-Down Attention: Different Processes and Overlapping Neural Systems", In the Journal of the Neuroscientist, vol. 20 Issue 5, Jan. 2014, pp. 509-521.

Kingma, et al., "ADAM: A Method for Stochastic Optimization", In International Conference on Learning Representations vol. 5, Jan. 2015, 15 Pages.

Kiros, et al., "Unifying Visual-Semantic Embeddings With Multimodal Neural Language Models", Retrieved From: https://arxiv.org/pdf/1411.2539.pdf, Nov. 10, 2014, 13 Pages.

Klein, et al., "Associating Neural Word Embeddings with Deep Image Representations using Fisher Vectors", In Proceedings of the IEEE Conference on Computer Vision and Pattern Recognition, Jan. 2015, pp. 4437-4446.

Krishna, et al., "Visual Genome: Connecting Language and Vision using Crowdsourced Dense Image Annotations", In International Journal of Computer Vision vol. 123, Issue 1, Feb. 2017, 44 Pages.

Kumar, et al., "Ask Me Anything: Dynamic Memory Networks for Natural Language Processing", In International Conference on Machine Learning, Mar. 5, 2016, 10 Pages.

Lee, et al., "CleanNet: Transfer Learning for Scalable Image Classifier Training with Label Noise", Retrieved From: https://arxiv.org/pdf/1711.07131.pdf, Mar. 25, 2018, 10 Pages.

Lee, et al., "Stacked Cross Attention for Image-Text Matching", In White Paper, Jul. 23, 2018, 25 Pages.

Lev, et al., "RNN Fisher Vectors for Action Recognition and Image Annotation", In European Conference on Computer Vision, Oct. 08, 2016, 11 Pages.

Li, et al., "A Hierarchical Neural Autoencoder for Paragraphs and Documents", In Proceedings of the 53rd Annual Meeting of the Association for Computational Linguistics and the 7th International Joint Conference on Natural Language Processing, Jul. 26, 2015, pp. 1106-1115.

Lin, et al., "Microsoft COCO: Common Objects in Context", In European conference on computer vision, Sep. 6, 2014, 15 Pages.

Luong, et al., "Effective Approaches to Attention-Based Neural Machine Translation", In Proceedings of the 2015 Conference on Empirical Methods in Natural Language Processing, Sep. 17, 2015, pp. 1412-1421.

Nam, et al., "Dual Attention Networks for Multimodal Reasoning and Matching", In Proceedings of the IEEE Conference on Computer Vision and Pattern Recognition, Mar. 21, 2017, 9 Pages.

Niu, et al., "Hierarchical Multimodal LSTM for Dense Visual-Semantic Embedding", In Proceedings of IEEE International Conference on Computer Vision, Oct. 22, 2017, 9 Pages.

Peng, et al., "Cross-Modal Generative Adversarial Networks for Common Representation Learning", In Journal of IEEE Transactions on Multimedia, Oct. 14, 2107, 13 Pages.

Ren, et al., "Faster R-CNN: Towards Real-Time Object Detection with Region Proposal Networks", In Journal of Advances in Neural Information Processing Systems, Jan. 2015, 9 Pages.

Rush, et al., "A Neural Attention Model for Abstractive Sentence Summarization", In the Proceedings of Empirical Methods in Natural Language Processing, Sep. 3, 2015, 11 Pages.

Schuster, et al., "Bidirectional recurrent neural networks", In the Journal of IEEE Transactions on Signal Processing, vol. 45, Issue 11, Nov. 11, 1997, pp. 2673-2681.

Socher, et al., "Grounded Compositional Semantics for Finding and Describing Images with Sentences", In the Journal of Transactions of the Association of Computational Linguistics, vol. 2, Issue 1, Apr. 2014, pp. 207-218.

Vendrov, et al., "Order-Embeddings of Images and Language", Published as a conference paper at ICLR, Mar. 1, 2016, 12 Pages.

Wang, et al., "Learning Deep Structure-Preserving Image-Text Embeddings", In Proceedings of the IEEE Conference on Computer Vision and Pattern Recognition, Jan. 2016, pp. 5005-5013.

(56) References Cited

OTHER PUBLICATIONS

Xu, et al., "Fine-Grained Text to Image Generation with Attentional Generative Adversarial Networks", In Proceedings of the IEEE Conference on Computer Vision and Pattern Recognition, Nov. 27, 2017, 9 Pages.
Xu, et al., "Show, Attend and Tell: Neural Image Caption Generation with Visual Attention", In Proceedings of 32nd International Conference on Machine Learning, Jun. 1, 2015, 10 Pages.
Yang, et al., "Hierarchical Attention Networks for Document Classification", In Proceedings of the 2016 Conference of the North American Chapter of the Association for Computational Linguistics: Human Language Technologies, Jun. 12, 2016, pp. 1480-1489.
Young, et al., "From Image Descriptions to Visual Denotations: New Similarity Metrics for Semantic Inference Over Event Descriptions", In the Journal of Transactions of the Association for Computational Linguistics, vol. 2, Feb. 28, 2014, pp. 67-78.
Zheng, et al., "Dual-path convolutional image-text embedding", In the Journal of Latex Class Files, vol. 14, Issue No. 8, Jul. 17, 2018, 15 Pages.

\* cited by examiner

STACKED CROSS-MODAL MATCHING

BACKGROUND

Data can be stored in one of several modalities, such as text, audio, image, etc. The ability to compare and match data of different modalities can be very useful in numerous applications. For example, using text to search for a matching image entails comparing data of different modalities, i.e., comparing the text and candidate images. The present disclosures relate to improved techniques for comparing and matching data of different modalities.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
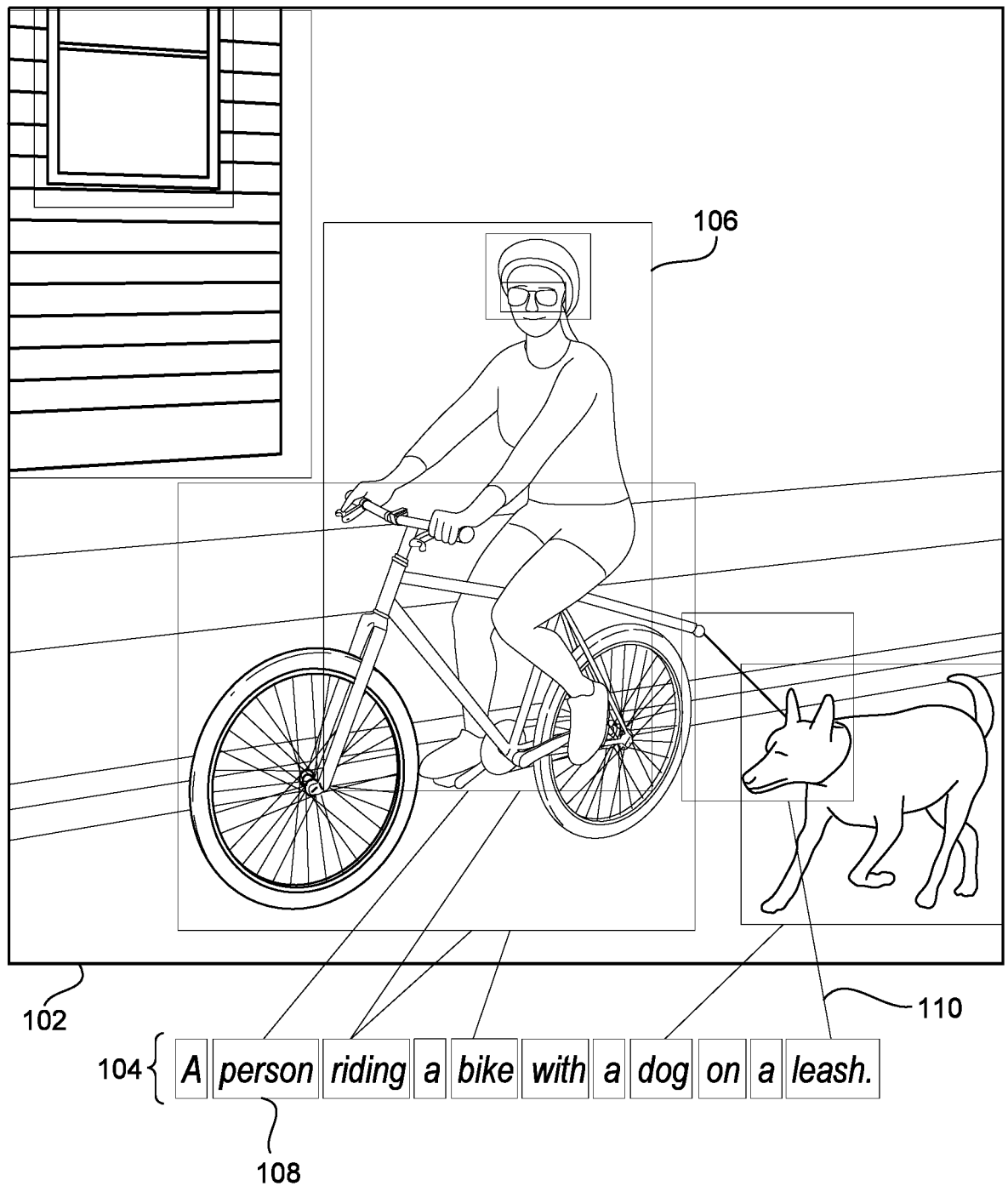
FIG. 1 illustrates an example cross-modal comparison of data, consistent with some implementations of the present concepts.

The present concepts relate to comparing and matching data of two different modalities. For example, text may be matched with videos, speech may be matched with images, text of two different foreign languages may be matched, and so on.

Conventional techniques for comparing data of two different modalities have several shortcomings. In the context of comparing text and images, for example, traditional models have mapped whole images and whole sentences to a common semantic vector space for image-text matching. However, such traditional models do not consider the latent vision-language correspondence at the level of image regions and words. That is, traditional models do not fully exploit the corresponding alignments between regions and words.

People tend to pay attention to salient instances in an image like objects instead of the background in the image. Accordingly, some conventional models detect and encode regions in an image at object level, and then infer the image-text similarity by aggregating the similarity scores of region-word pairs. For instance, some conventional models map noun phrases within a sentence and objects in an image into a shared embedding space on top of the full sentence and whole image embeddings. However, these conventional models do not use the attention mechanism to learn to focus on more important regions for a given semantic context. That is, not all regions have the same importance or relevance to the sentence being compared.

Some prior models for image-text matching often detect regions in an image at an object level and then simply aggregate the similarities of pairs of regions and words in a sentence to infer the global image-text similarity. Other prior models just take the maximum of the region-word similarity scores with respect to each word and then average the results corresponding to the words. However, these prior models do not consider the fact that the importance of the words can depend on the visual context. That is, not all the words have the same importance or relevance to the image being compared.

Therefore, conventional techniques simply aggregate the similarity of pairs of components (e.g., regions or words) in the data without discriminating or attending to the more and less important components of the data. In other words, conventional techniques do not give more weight to the more important words and region and give less weight to the less important words and regions when matching text and images.

Other conventional techniques use a multi-step attentional process to capture only a limited number of alignments between the two data. That is, some conventional models focus on only certain context-specific aspects of data, i.e., a pair of instances appearing in both the image and the sentence. However, these conventional models adopt a multi-step reasoning with a predefined number of steps to look at one semantic matching (e.g., an object in the image and a phrase in the sentence) at a time, despite the fact that the number of semantic matchings varies for different images and sentences.

The present concepts overcome the shortcomings and deficiencies of prior techniques. Consistent with the present concepts, fine-grained interplay between data of two different modalities can be captured by inferring latent semantic alignments between corresponding components of the two data. For example, in the context of matching images and text, the present concepts discover the full latent alignments between an image and a sentence using both the regions in the image and the words in the sentence as context to infer the overall similarity between the image and the sentence. Furthermore, the present concepts involve a stacked two-stage attention mechanism to appropriately weigh the more important words in a sentence and more important regions in an image when inferring the overall similarity between the image and sentence. Therefore, the present concepts have the advantages of thoroughly considering combinations of the components of data and the advantages of appropriately giving more or less weight to the more important and less important components of the data. Such techniques significantly improve the accuracy of matching two data of different modalities.

Moreover, the present concepts are able to more accurately measure similarity of data from different modes even when trained using relatively sparse data, i.e., data with relatively few training examples for certain words or image objects. On the other end of the spectrum, the present concepts can better handle learning from noisy data, i.e., data with mismatches between words and image regions, than conventional techniques. Through the stacked two-stage attention processes, the present concepts highlight the more important components of data while drowning out the less important components. Therefore, the present concepts are better equipped to evaluate wordy sentences with lots of verbiage or crowded images with lots of features. Accordingly, the present concepts provide a more robust framework for accurately comparing and matching a wider range of sparse and noisy data.

For example, when comparing an image and a sentence, such as in the context of a query search, the present concepts may involve detecting salient regions in the image to encode a set of region feature vectors and also encoding the sentence into a set of word feature vectors. Then, the similarity between the image and the sentence may be inferred by a two-stage stacked cross-modal attention technique that compares the similarities between the regions and the words, and learns the relevance of the regions and words. The regions' and words' relevance may correlate to their importance in inferring the overall similarity between the whole image and the whole sentence.

Specifically, in one implementation, the first stage may involve attending to the words in the sentence with respect to each region of the image to determine which specific words correspond to each region, i.e., which specific words in the sentence are more or less relevant to a particular region. And then the second stage may involve attending to the regions with respect to the attended sentence to determine which specific regions are more or less relevant to the sentence (i.e., whether the sentence mentions the region or not) for inferring the similarity between the image and the sentence. Likewise, the two-stage cross attention may be performed in reverse: attend to the regions first and then attend to the words second.

Therefore, consistent with present concepts, latent alignments between regions and words are discovered, and lesser relevant regions and words may be filed out so as to drastically improve the matching process for the image and the sentence. The present concepts enable attention with context both from the image and from the sentence in multiple stages. Unlike traditional models that perform fixed-step attentional reasoning and thus only focus on limited semantic alignments one at a time, the present concepts discover multiple alignments simultaneously. Since the number of semantic alignments varies with different images and sentences, the correspondence inferred by the present concepts is more comprehensive, thus making image-text matching more interpretable. Accordingly, the present concepts discover the full latent visual-semantic alignments and thereby achieve improved performance and results in image retrieval from text query as well as text retrieval from image query. Furthermore, as explained above, implementations consistent with the present concepts may involve attending differentially to important regions and words as context for inferring the image-sentence similarity, which further improves the accuracy of matching.

Example Scenarios

FIG. 1 illustrates an example cross-modal comparison of data of two different modalities, consistent with some implementations of the present concepts. In this example, first data may include an image 102, and second data may include a sentence 104. Therefore, the first data is of the image modality, and the second data is of the text modality.

The image 102 may include several features, such as objects, actions, and attributes, depicted by the image 102. For example, the features in the image 102 may include a person riding a bike; the bike having wheels, pedals, and seats; a running dog tied by a leash to the bike; a house with a glass window; the person wearing a helmet and sunglasses; etc. The image 102 can include a plurality of regions containing one or more features. In FIG. 1, the image 102 includes rectangular bounding boxes 106 that have been illustrated to represent the regions that contain a person, a bike, a dog, a leash, a helmet, sunglasses, a house, and a window. These specific regions and features have been described as examples for illustrative purposes, but the image 102 obviously contains other regions and features, such as arms, legs, eyes, tail, shoes, wheels, spokes, spinning, pedaling, sidewalk, street, etc.

The sentence 104 ("A person riding a bike with a dog on a leash.") may also include several features, such as words, grammar, context, and meaning, conveyed by the sentence 104. For example, in FIG. 1, the words in the sentence 104 are illustrated as being surrounded by individual boxes 108. The term "sentence" refers broadly to any collection of one or more words, such as a string, a phrase, a snippet of text, etc., and need not be a complete sentence in a grammatical sense.

When people use sentences to describe images, the sentences may include references to objects and other salient features (e.g., attributes and actions of the objects) in the images. For example, the word "person" in the sentence 104 may refer to the person in the image 102, and the word "bike" in the sentence 104 may refer to the bike in the image 102. Accordingly, in a sense, a sentence may include annotations of an image, where the words in the sentence correspond to particular regions in the image. By resolving such alignments between the words in the sentence 104 and the regions in the image 102, the matching process can be improved. As explained in more detail below, present concepts involve inferring latent correspondence between regions and words by capturing fine-grained interplay between vision and language to improve image-text matching.

In this example, FIG. 1 includes correspondence lines 110 between certain regions in the image 102 and the corresponding words in the sentence 104. These correspondence lines 110 represent, in a very rudimentary fashion, certain alignments between the image 102 and the sentence 104. As it is apparent from this example, not all the regions in the image 102 are described by the sentence 104, and not all the words in the sentence 104 describe the image 102. That is, there are more important and less important words and regions for comparing the image 102 and the sentence 104. Therefore, the image-text matching technique can be improved by determining which regions and which words are more important or less important for matching the image 102 and the sentence 104 using attention mechanisms.

Figure 2:
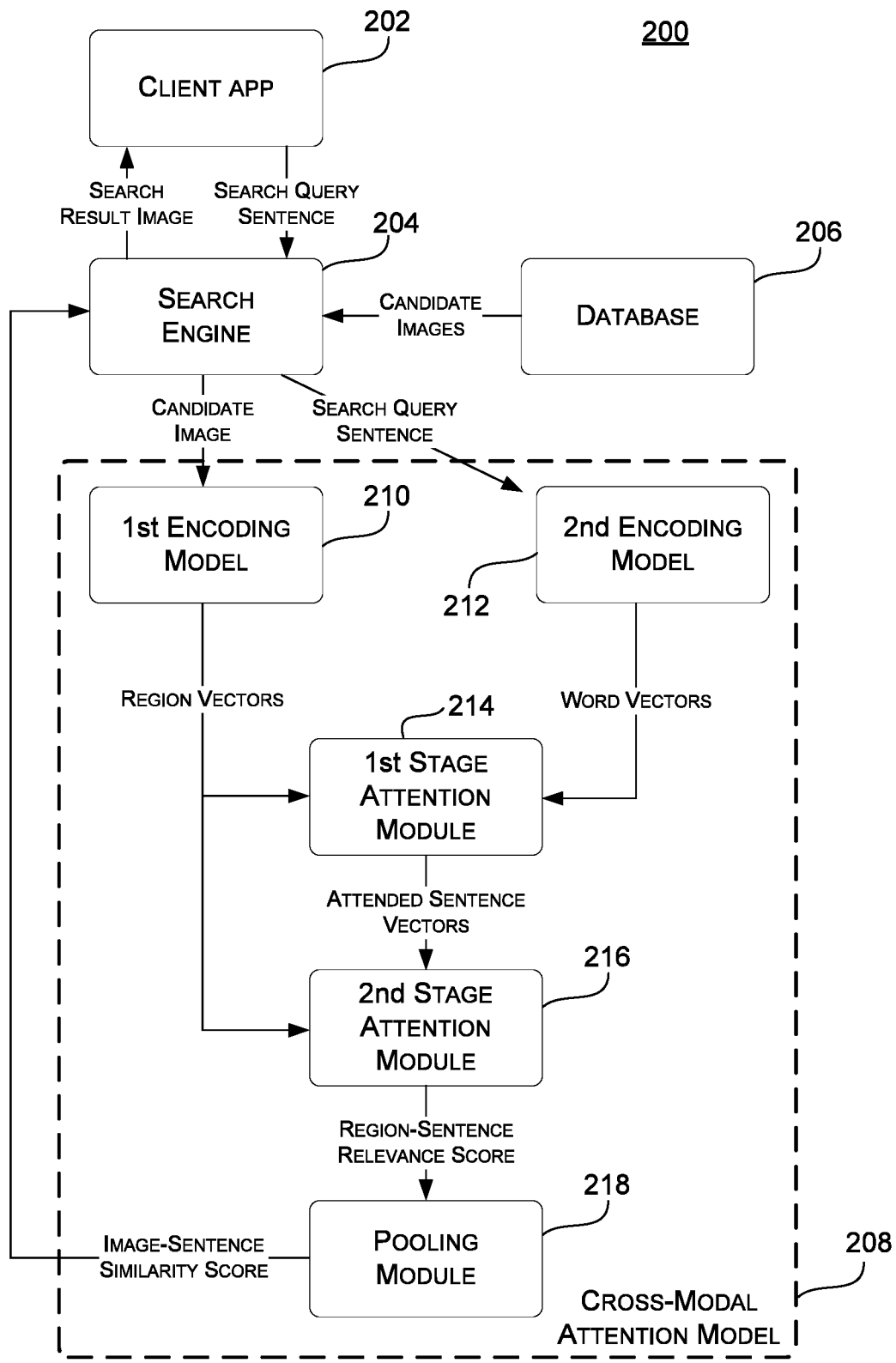
FIG. 2 shows a flow diagram illustrating an example flow of information among various modules, consistent with some implementations of the present concepts.

FIG. 2 shows a flow diagram 200 illustrating an example flow of information among various modules, consistent with some implementations of the present concepts. The present concepts will be described in detail in the context of a search operation scenario involving the text and image modalities, but many other applications of the present concepts involving other combinations of modalities are possible, as explained below.

The scenario illustrated in FIG. 2 may involve a search using a sentence query to return an image result that best matches the sentence query. For instance, a client application 202 may initiate the search by providing a search query sentence to a search engine 204. The client application 202 may be a browser or another type of software application on a client device. The search query sentence may be, for example, the sentence 104 ("A person riding a bike with a dog on a leash.") in FIG. 1. The search query sentence 104 may have been provided by a user of the client device or by an application. In this example scenario, the client application 202 may be providing the search query sentence 104 in order to receive a search result image that matches the search query sentence 104 from the search engine 204.

In one implementation, the search engine 204 may reside on a server device that can communicate with the client application 202 on the client device via a network, such as the Internet. The search engine 204 may be accessible by the client application 202 via a website having an associated universal resource locator ("URL"). For example, the server device may host the website. The search engine 204 may be configured to receive search queries from Internet users (e.g., a user using the client application 202), search through and analyze search candidates, and return search results to the Internet users (e.g., to the client application 202). The search results returned by the search engine 204 may include URLs to other resources on the Internet. The search engine 204 may include or operate in conjunction with an index of search candidates.

In some implementations, in response to receiving the search query sentence 104 from the client application 202, the search engine 204 may retrieve a set of candidate images from a database 206 for analysis to determine which of the candidate images best matches the search query sentence 104. For example, one of the candidate images retrieved from the database 206 may be the image 102 in FIG. 1. The best matching candidate image may in turn be returned as the search result image by the search engine 204 to the client application 202. The search engine 204 may use any known techniques for retrieving the set of candidate images from the database 206, such as, for example, retrieve all images in the database 206 or retrieve a subset of all images based on, for example, image tags, image popularity, etc., to streamline the search process.

Consistent with some implementations of the present concepts, the search engine 204 may use a cross-modal attention model 208 to evaluate the similarities between the search query sentence 104 and the candidate images (i.e., image-sentence pairs) and to identify the search result image to return to the client application 202. Thus, the search engine 204 may provide the search query sentence 104 and the set of candidate images to the cross-modal attention model 208. The cross-modal attention model 208 in FIG. 2 will be explained in greater detail below with references to additional figures.

The cross-modal attention model 208 may include a first encoding model 210 and a second encoding model 212. In this example scenario, the first encoding model 210 may be an image-encoding model for encoding images, and the second encoding model 212 may be a text-encoding model for encoding text. Each candidate image may be inputted into the first encoding model 210 to generate a plurality of region vectors. And the search query sentence 104 may be inputted into the second encoding model 212 to generate a plurality of word vectors. Consistent with the present concepts, the first encoding model 210 and the second encoding model 212 may map images and sentences to a common semantic vector space. Accordingly, the present concepts can compare a data pair of any two modalities by mapping the data pair to a common semantic vector space.

Image Encoding

Figure 3:
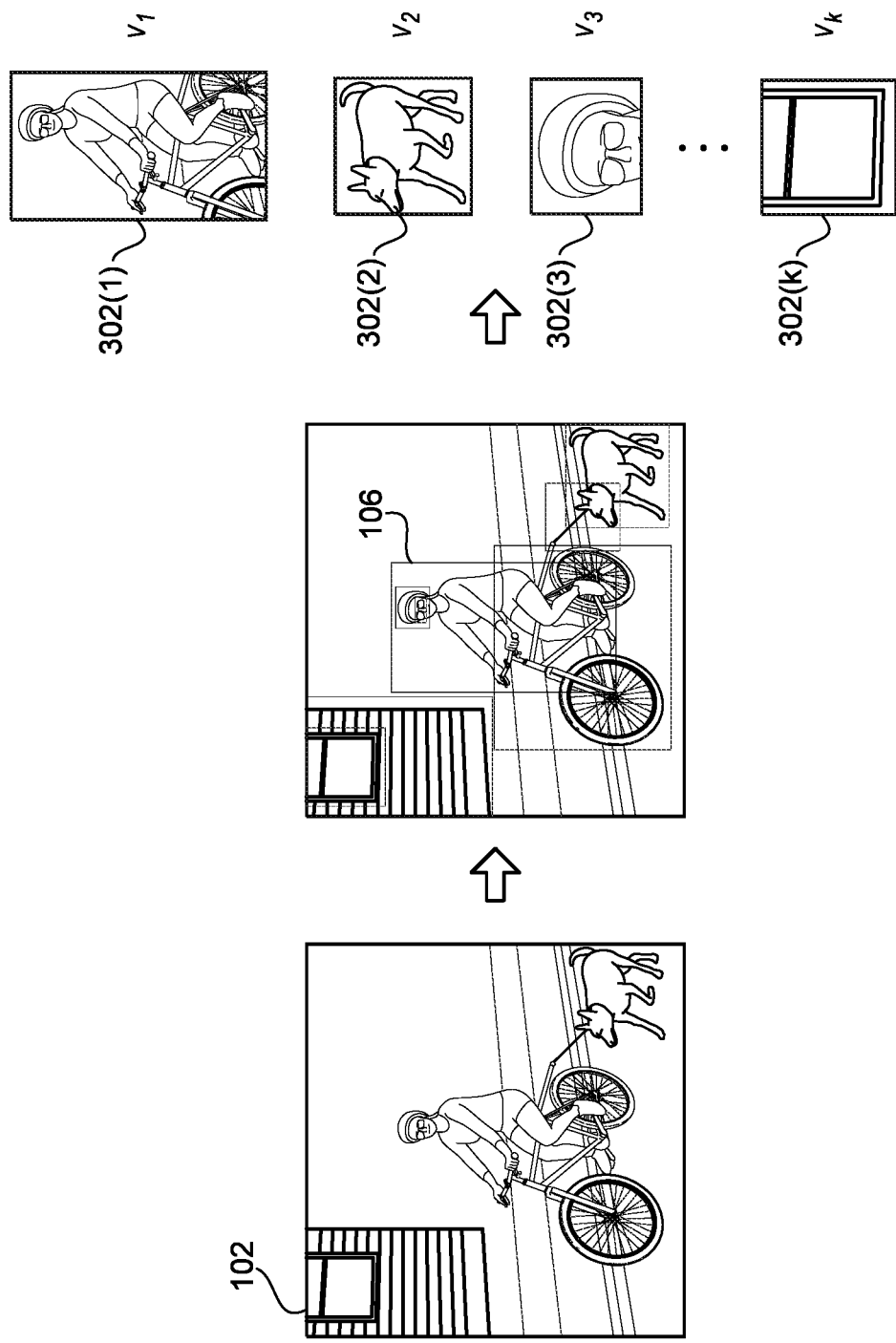
FIG. 3 illustrates an example generation of region vectors, consistent with some implementations of the present concepts.

FIG. 3 illustrates an example generation of region vectors, consistent with some implementations of the present concepts. For illustrative purposes, the candidate image being considered by the search engine 204 and being compared by the cross-modal attention model 208 will be the image 102 in FIG. 1, which is the same image 102 reproduced on the left-hand side of FIG. 3.

In some implementations consistent with the present concepts, the first step may involve detecting salient regions 302(1), 302(2), . . . , 302(k) within the image 102 using the first encoding model 210. In this example, there are k detected regions in the image 102. The detected regions 302 are illustrated by bounding boxes 106 in the middle of FIG. 3. And then the second step may involve encoding a set of region vectors $v_1, \ldots, v_k$ to represent the respective detected regions 302(1), 302(2), . . . , 302(k) using the first encoding model 210.

In one implementation, the image 102 may be represented as a raw image using RGB channel data, which may be inputted into the first encoding model 210. The first encoding model 210 may then output visual representations of the regions 302 in the image 102 as feature vectors $v_i$ in a semantic space.

The first encoding model 210 may utilize one or more region detection algorithms and encoding techniques to detect salient regions 302 in the image 102 and to output a set of region vectors $v_i$ to represent the detected regions 302. The first encoding model 210 may use, for example, rule-based techniques and/or neural networks, such as Fast region-based convolutional neural network ("R-CNN") and Faster R-CNN.

In one implementation, the first encoding model 210 may use a Faster R-CNN model to detect salient regions 302 of the image 102 and generate regions vectors $v_i$ representing the image 102. Faster R-CNN may be a two-stage object detection framework. In the first stage involving a region proposal network ("RPN"), a grid of anchors tiled in space, scale, and aspect ratio may be used to generate bounding boxes (i.e., region of interests ("ROIs")) with high objectness scores. In the second stage, the representations of the ROIs may be pooled from the intermediate convolution feature map for region-wise classification and bounding box regression. A multi-task loss considering both classification and localization can be minimized in both the RPN and final stages.

In some implementations of the present concepts, the first encoding model 210 may implement the Faster R-CNN model in conjunction with a residual neural network ("ResNet"), such as ResNet-101, that is pre-trained. In order to learn feature representations with rich semantic meaning, instead of predicting the object classes, the first encoding model 210 may predict attribute classes and instance classes, in which instance classes may contain objects and other salient features that may be difficult to localize (e.g., sky, grass, building, furry, etc.).

In some implementations, the neural networks of the first encoding model 210 may be trained using a corpus of corresponding images and text, such as Microsoft Common Objects in Context ("MS-COCO") or Flickr30k dataset. The neural networks may also be trained with negative signals using a set of mismatching image-text pairs. For instance, negative regions may be randomly sampled to generate a corpus of image-text pairs having negative correspondence. In some implementations, the training dataset of corresponding images and text may be sourced from historical records of past searches and user clicks on search results. For example, when users provide search query text and are returned search result images, the result images (or associated URLs) that the users click on may be recorded and deemed corresponding images to the query text. Accordingly, image-text correspondence may be learned from the click probabilities associated with the images and the subject text.

Consistent with present concepts, an image I may be represented with a set of region feature vectors V={$v_1, \ldots, v_k$}, $v_i \in \mathbb{R}^D$, such that each region feature vector $v_i$ encodes a region in the image I. For example, in one implementation, for each selected region i in the image I, $f_i$ may be defined as the mean-pooled convolutional feature from the region i, such that the dimension of the image feature vector is 2048. Alternatively, other dimensions, such as 1024 or 4096, may be used. Then, a fully-connect layer may be added to transform $f_i$ to an h-dimensional vector $v_i = W_v f_i + b_v$. Therefore, the complete representation of the image I may be a set of embedding vectors V={$v_1, \ldots, v_k$}, $v_i \in \mathbb{R}^D$, where each $v_i$ encodes a salient region, and k is the number of regions in the image I.

In the example illustrated in FIG. 3, the image 102 has been encoded into a plurality of region vectors $v_1, \ldots, v_k$ that represent the k salient regions 302 in the image 102. For example, the region 302(1) containing a person, the region 302(2) containing a dog, the region 302(3) containing a helmet, and the region 302(k) containing a window are illustrated in FIG. 3. The ellipsis has been included in FIG. 3 (and other figures) to indicate that other regions and region vectors have been omitted due to space constraints.

Sentence Encoding

Figure 4:
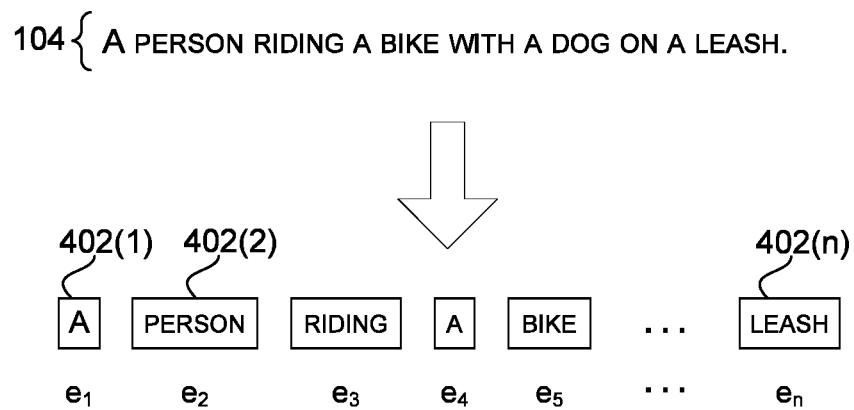
FIG. 4 illustrates an example generation of word vectors, consistent with some implementations of the present concepts.

FIG. 4 illustrates an example generation of word vectors, consistent with some implementations of the present concepts. The sentence 104 in FIG. 4 is the same example sentence 104 shown in FIG. 1 (i.e., "A person riding a bike with a dog on a leash."). The sentence 104, which comprises a plurality of words 402(1), 402(2), . . . , 402(n), may be encoded into a plurality of word feature vectors $e_1, \ldots, e_n$ using the second encoding model 212. The second encoding model 212 may use, for example, rule-based techniques and/or neural networks for encoding the sentence 104 into word vectors $e_j$. For example, the words 402 in the sentence 104 may be represented by one-hot vectors, which are input into a recurrent neural network ("RNN") to create a semantic vector $e_j$ for each word 402. The RNN may be trained using matching image-sentence pairs. The same corpus of matching image-text pairs used to train the first encoding model 210 may also be used to train the second encoding model 212. Consistent with some implementations of the present concepts, to connect the domains of vision and language, the sentence 104 may be mapped to the same h-dimensional semantic vector space as the image 102.

Consistent with the present concepts, given a sentence T having n words, one simple approach would be to map every word in the sentence T individually. However, such a simple approach would not consider any semantic context in the sentence T. Therefore, consistent with the present concepts, the second encoding model 212 may employ an RNN to embed the words of the sentence T along with their context.

For example, the j-th word $w_j$ in the sentence T containing n words $w_1$ to $w_n$ may be represented with a one-hot vector $x_j$ showing the index of the word in the vocabulary, and may be embedded into a 300-dimensional vector through an embedding matrix $W_e$:

$$W_e x_j = W_e w_j, j \in [1, n].$$

Then, a bi-directional gated recurrent unit ("GRU"), which is a type of RNN, may be used to map the vector to the final word feature along with the sentence context by summarizing information from both forward and backward directions in the sentence T. That is, the bi-directional GRU may contain a forward GRU, which reads the sentence T from $w_1$ to $w_n$ and calculates a sequence of forward hidden states:

$$\vec{h}_j = \overrightarrow{GRU}(x_j), j \in [1, n],$$

and may also contain a backward GRU, which reads the sentence T from $w_n$ to $w_1$ and calculates a sequence of backward hidden states:

$$\overleftarrow{h}_j = \overleftarrow{GRU}(x_j), j \in [1, n].$$

The final word feature vector $e_j$ may be defined by averaging the forward hidden state $\vec{h}_j$ and the backward hidden state $\overleftarrow{h}_j$, which summarize information of the sentence T centered around word $w_j$:

$$e_j = \frac{(\vec{h}_j + \overleftarrow{h}_j)}{2}, j \in [1, n].$$

In the example illustrated in FIG. 4, the sentence 104 has been encoded into a plurality of word vectors $e_1, \ldots, e_n$ that represent the plurality of words 402 in the sentence 104.

Stacked Two-Stage Cross Attention

Referring to FIG. 2 again, the cross-modal attention model 208 may include a first stage attention module 214 and a second stage attention module 216 for performing the first and second stages, respectively, of the two-stage cross-modal attention technique, consistent with the present concepts. As described above, the first encoding model 210 has generated the region vectors $v_i$ that encode the image 102, and the second encoding model 212 has generated the word vectors $e_j$ that encode the sentence 104. Next, the region vectors $v_i$ and the word vectors $e_j$ may be compared in a stacked two-stage attention process.

Consistent with the present concepts, the stacked two-stage attention process may be performed via one or more of alternative and/or complementary formulations, including, for example, (1) an image-text formulation and (2) a text-image formulation. Each formulation may involve two stages of attention. Either one or both of the formulations may be used to determine the degree of similarity between the image 102 and the sentence 104. Both of these example formulations will be explained below.

Image-Text Formulation

In the image-text formulation, which will be described first, the first stage attends to the words 402 in the sentence 104 with respect to each region 302 to determine the importance of the words 402, and the second stage attends to the regions 302 with respect to the sentence 104 to determine the importance of the regions 302. FIG. 2 illustrates an implementation consistent with the image-text formulation.

First Stage Attention

At a high level, the first stage may entail looking at a region (e.g., the region 302(2) that includes a dog) in the image 102 and searching for words 402 in the sentence 104 that correspond to the region 302(2) to discover, for example, that the word "dog" in the sentence 104 is important to the region 302(2). This process may be performed for each region 302 in the image 102. This searching is called "attention" and finds which word or words 402 in the sentence 104 have the biggest response to a particular region 302 in the image 102. The intermediary output of the first stage attention may be weighted sums that represent the responses in the form of attended sentence vectors associated with the regions 302. For example, the first stage attention may extract what corresponds to the dog from the sentence 104 to generate the attended sentence vector for the region 302(2). The first stage attention provides a significant improvement over conventional models that treat all words to be equally important.

In the first stage, the cross-modal attention model 208 may take the regions vectors $v_i$ output by the first encoding model 210 and the word vectors $e_j$ output by the second encoding model 212, and input the region vectors $v_i$ and the word vectors $e_j$ into the first stage attention module 214 to perform the first stage attention. The first stage attention module 214 may compare the regions vectors $v_i$ and the word vectors $e_j$ to identify relevant words 402 in the sentence 104 that describe a particular region 302.

Figure 5:
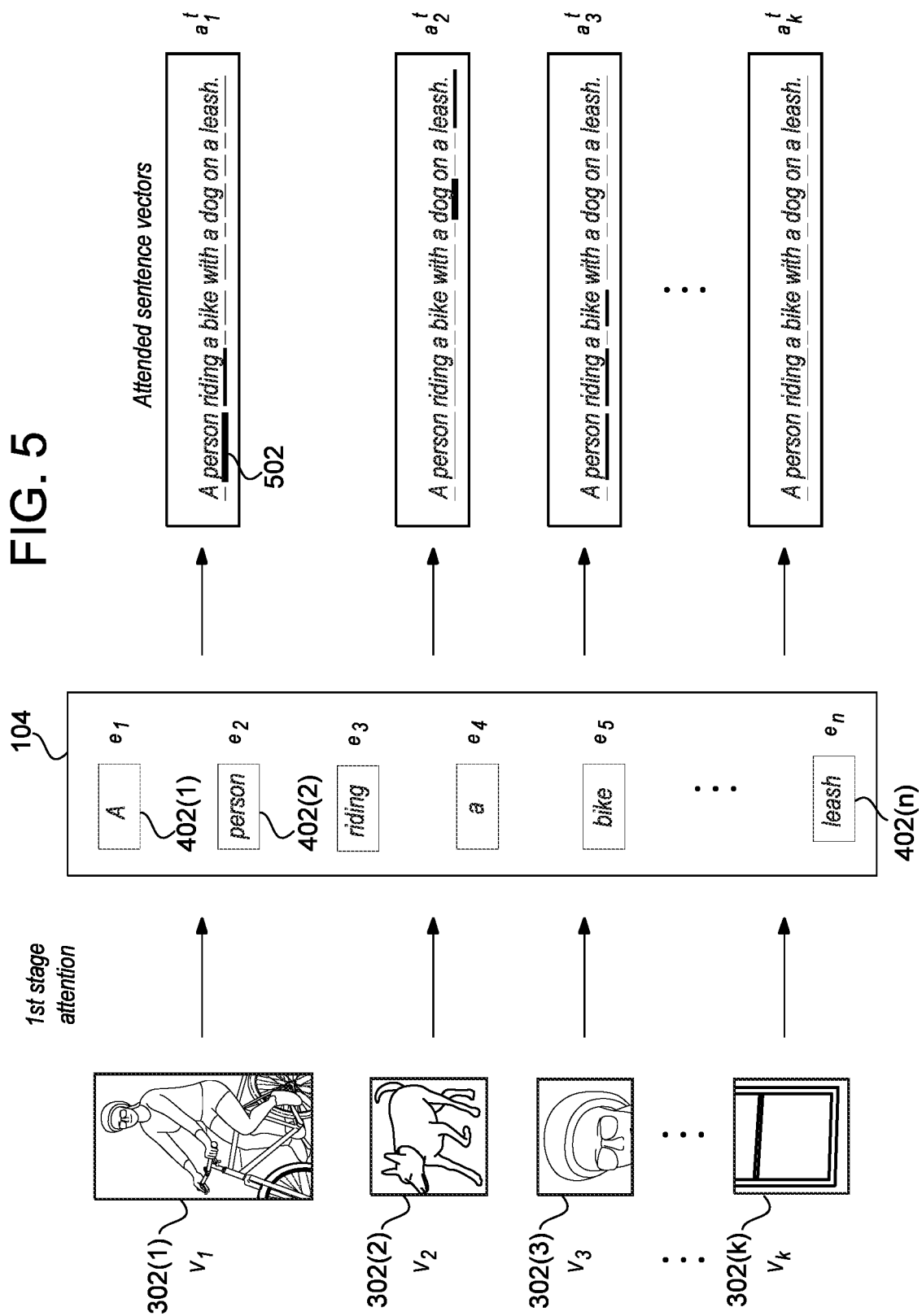
FIG. 5. illustrates an example first stage attention, consistent with some implementations of the present concepts.

FIG. 5. illustrates an example first stage attention, consistent with some implementations of the present concepts. On the left side of FIG. 5 are regions vectors $v_1, \ldots, v_k$ representing the plurality of regions 302 in the image 102. In the middle of FIG. 5 are word vectors $e_1, \ldots, e_n$ representing the plurality of words 402 in the sentence 104. The first stage attention module 214 may compare each region 302 with each word 402 to determine which words 402 in the sentence 104 correspond to a particular region 302. This correspondence may be represented by attended sentence vectors $a_i^t$ generated by the first stage attention module 214 and illustrated on the right side of FIG. 5. Consistent with the present concepts, the attended sentence vectors $a_i^t$ may be weighted combinations of the word vectors $e_j$. In FIG. 5, the weights in the attended sentence vectors $a_i^t$ are indicated by the thickness of the underlines 502 below the words 402 in the sentence 104 (e.g., thicker underlines representing higher weight).

Consistent with the present concepts, the first stage attention module 214 may receive two inputs—a set of region feature vectors $V=\{v_1, \ldots, v_k\}$, $v_i \in \mathbb{R}^D$, such that each region vector encodes a region in the image I; and a set of word feature vectors $E=\{e_1, \ldots, e_n\}$, $e_j \in \mathbb{R}^D$, such that each word vector encodes a word in the sentence T—and outputs an attended sentence vector $a_i^t$ (explained below) for each i-th region. For example, given the image I with k detected regions and the sentence T with n words, the first stage attention module 214 may use a comparison function to compare the regions and the words. For instance, the first stage attention module 214 may compute a cosine similarity matrix for region-word pairs:

$$s_{ij} = \frac{v_i^T e_j}{\|v_i\|\|e_j\|}, i \in [1, k], j \in [1, n].$$

Here, $s_{ij}$ represents the similarity between the i-th region and the j-th word. Optionally, the similarities may be set to have a zero threshold, and the similarity matrix may be normalized as:

$$\bar{s}_{ij} = [s_{ij}]_+ / \sqrt{\Sigma_{i=1}^k [s_{ij}]_+^2}, \text{ where } [x]_+ = \max(x, 0).$$

To attend on the words with respect to each region, the first stage attention module 214 may generate an attended sentence vector $a_i^t$ for each i-th region. The attended sentence vector $a_i^t$ may be defined as a weighted sum of the word vectors $e_j$:

$$a_i^t = \sum_{j=1}^n \alpha_{ij} e_j$$

where the weights $\alpha_{ij}$ may be defined as a softmax function:

$$\alpha_{ij} = \frac{\exp(\lambda_1 \bar{s}_{ij})}{\sum_{j=1}^n \exp(\lambda_1 \bar{s}_{ij})}$$

where $\lambda_1$ is the inverse temperature parameter of the softmax function. The attended sentence vectors $a_i^t$ may map to the same semantic vector space as the region vectors $v_i$ and the word vectors $e_j$. The first stage attention module 214 may use other formulas or techniques, such as a dot product attention.

As illustrated in FIG. 5, for example, the region 302(1) containing a person may be compared with each of the words 402 in the sentence 104 to generate an attended sentence vector $a_1^t$ associated with this region 302(1). As expected, the region 302(1) containing the person corresponds strongly with the word "person" 402(2), as indicated by the thick underlining of the word "person" in the associated attended sentence vector $a_1^t$, corresponds weakly with the word "riding," as indicated by the medium-thick underlining of the word "riding," and lacks correspondence with all the other words in the sentence 104, as indicated by the thin underlining of the other words. The weights of the correspondence may be, of course, continuous rather than discrete. The three levels of underlining thickness shown in the figures are used only for the purposes of illustration. Furthermore, the region 302(2) containing the dog corresponds strongly with the word "dog," corresponds weakly with the word "leash," and has no correspondence with all other words in the sentence 104, as indicated by the appropriate underlining thicknesses. The region 302(3) containing the helmet does not correspond strongly with any word 402 in the sentence 104, because the sentence 104 does not mention the helmet explicitly. Nonetheless, the region 302(3) may still have some degrees of weak correspondence with the words "person," "riding," and "bike." The region 302(k) containing the window lacks correspondence with all the words 402 in the sentence 104.

Consistent with the present concepts, the first stage attention essentially determines which regions 302 in the image 102 correspond to which words 402 in the sentence 104. One objective of the first stage attention may be raising the importance (using weights) of certain words 402 in the sentence 104 that correspond to certain regions 302 in the image 102. Different regions 302 will give higher or lower weight to different words 402 in the sentence 104. Consistent with the present concepts, the comparison of every region-word pair enables the discovery of the full latent alignments between the regions 302 of the image 102 and the words 402 of the sentence 104, and the detection of fine-grained interplay between the image 102 and the sentence 104, which are of two different modalities. There is no limit to the number of regions 302 and the number of words 402 that can be analyzed. By comparing each region vector $v_i$ with each word vector $e_j$, the present concepts discover which region-word pair provides the biggest response for the matching process.

Second Stage Attention

After the first stage attends to the important words 402 in the sentence 104, the second stage attends to the important regions 302 in the image 102. In the second stage, the responses between each region 302 and each word 402 extracted in the first stage (i.e., the attended sentence vectors $a_i^t$) may be compared with the region vectors $v_i$ to determine which regions 302 are more or less important or relevant to the comparison of the image 102 and the sentence 104. For example, if the region 302(2) has a dog and the sentence 104 has the word "dog," then the region 302(2) may be given a high relevance score. Conversely, if the region 302(k) has a window and the sentence 104 does not mention a window, then the region 302(k) may be given a low relevance score.

Referring to FIG. 2 again, in the first stage described above, the cross-modal attention model 208 used the first stage attention module 214 to attend to the words 402 in the sentence 104 and to generate the attended sentence vectors $a_i^t$. Next, in the second stage, the cross-modal attention model 208 may use the second stage attention module 216 to attend to the regions 302 in the image 102 by comparing the region vectors $v_i$ and the attended sentence vectors $a_i^t$ and to generate a plurality of region-sentence relevance scores R. A region-sentence relevance score R is a similarity score that may indicate the importance or relevance of a particular region 302 with respect to the sentence 104. To avoid ambiguity, the similarity score between a region 302 and the sentence 104 may be called the region-sentence relevance score R to distinguish it from the image-region similarity score, which will be explained below.

Figure 6:
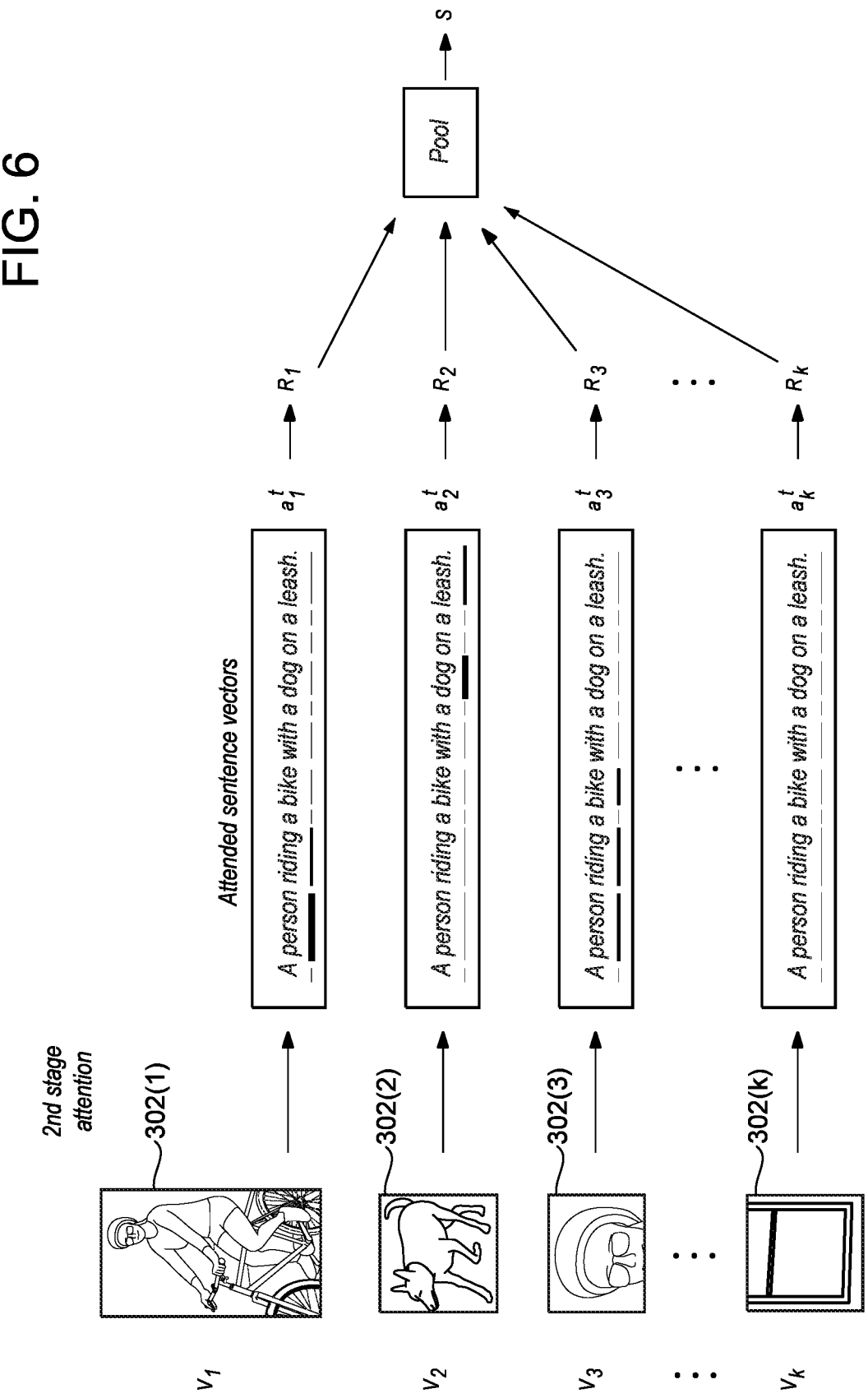
FIG. 6 illustrates an example second stage attention, consistent with some implementations of the present concepts.

FIG. 6 illustrates an example second stage attention, consistent with some implementations of the present concepts. On the left side of FIG. 6 are regions vectors $v_1, \ldots, v_k$ representing the plurality of regions 302 in the image 102. In the middle of FIG. 6 are the attended sentence vectors $a_i^t$ generated by the first stage attention module 214. Consistent with the present concepts, in the second stage, the region vectors $v_i$ may be compared with the attended sentence vectors $a_i^t$ to calculate region-sentence relevance scores $R_i$ that indicate the relevance or importance of the i-th region with respect to the sentence 104.

For example, to determine the importance of each region 302 given the sentence context, the second stage attention module 216 may determine the relevance between the i-th region and the sentence T using a comparison function, such as a cosine similarity between the region vector $v_i$ and the attended sentence vector $a_i^t$, to calculate a region-sentence relevance score $R_i$:

$$R(v_i, a_i^t) = \frac{v_i^T a_i^t}{\|v_i\| \|a_i^t\|}$$

A high value relevance score may indicate a strong relevance, whereas a low value relevance score may indicate a weak relevance. For instance, if the i-th region is not mentioned in the sentence T, its region vector $v_i$ would not be similar to the corresponding attended sentence vector $a_i^t$. Thus, comparing the region vector $v_i$ and the attended sentence vector $a_i^t$ would determine the low importance of the i-th region with respect to the sentence T and would result in a low region-sentence relevance score $R_i$.

In the example illustrated in FIG. 6, the region 302(1) with the person and the region 302(2) with the dog may result in high value region-sentence relevance scores R, because those image features in those regions 302(1) and 302(2) are explicitly mentioned in the sentence 104. In contrast, the region 302(k) containing the window may result in a low value region-sentence relevance score R, because the window is not described at all by the sentence 104. And the region 302(3) containing the helmet may generate a moderate value region-sentence relevance score R. Accordingly, consistent with the present concepts, the region-sentence relevance scores $R_i$ indicate the importance of the detected regions 302 in the context of the sentence 104.

Pooling

Next, the overall similarity between the image 102 and the sentence 104 may be scored by summarizing the plurality of region-sentence relevance scores $R_i$ using a pooling method (e.g., averaging, taking the maximum, or any other pooling technique). The two stages of attention described above have determined which regions (e.g., the regions 302(1) and 302(2) containing the person and the dog) are more important and which regions (e.g., the regions 302(3) and 302(k) containing the helmet and the window) are less important to matching the image 102 and the sentence 104. The pooling may prioritize regions 302 with high relevance scores and ignore (or filter out) regions 302 with low relevance scores.

Referring again to FIG. 2, the cross-modal attention model 208 has used the second stage attention module 216 to generate the region-sentence relevance scores $R_i$. Next, a pooling module 218 may pool the region-sentence relevance scores $R_i$ to calculate an image-sentence similarity score S. This process is also illustrated on the right side of FIG. 6. The pooling module 218 may aggregate or summarize the plurality of region-sentence scores $R_i$ in various ways including using, for example, a summation function (SUM) or a maximum function (MAX).

In one implementation consistent with the present concepts, the pooling module 218 can calculate the similarity between the image/and the sentence T by using, for example, a LogSumExp (LSE) pooling function:

$$S_{LSE}(I, T) = \log\left(\sum_{i=1}^{k} \exp(\lambda_2 R(v_i, a_i^t))\right)^{(1/\lambda_2)}$$

where $\lambda_2$ is a factor that determines how much to magnify the importance of the most relevant pairs of region vector $v_i$ and attended sentence vector $a_i^t$. As $\lambda_2 \to \infty$, the image-sentence similarity score S(I,T) approximates to $\max_{i=1}^{k} R(v_i, a_i^t)$. Alternatively, the pooling module 218 can calculate the image-sentence similarity score S by summarizing the region-sentence relevance scores $R(v_i, a_i^t)$ with an average pooling function (AVG):

$$S_{AVG}(I, T) = \frac{\sum_{i=1}^{k} R(v_i, a_i^t)}{k}$$

Accordingly, the image-sentence similarity score S can measure the overall similarity of an image-sentence pair. Consistent with the present concepts, the image-sentence similarity score S may incorporate and reflect the two-stage attention mechanism that attends differentially to regions and words using both as context to each other while inferring the overall similarity. Furthermore, as noted above, the present concepts, through the two-stage attention processes and the pooling mechanism, may discover and extract the relevant regions 302 and words 402 while discriminately filtering out unimportant regions 302 and words 402 to calculate the overall similarity score between the image 102 and the sentence 104.

Text-Image Formulation

In the above-described image-text formulation, the first stage attends to the words 402 in the sentence 104 with respect to each region vector $v_i$ to generate an attended sentence vector $a_i^t$ for the i-th region, and the second stage compares the region vectors $v_i$ and the attended sentence vectors $a_i^t$ to determine the relevance of each region 302 with respect to the sentence 104. Conversely but likewise, in the alternative text-image formulation, the first stage attends to the regions 302 in the image 102 with respect to each word vector $e_j$ to generate an attended image vector $a_j^v$ for the j-th word, and the second stage compares the word vectors $e_j$ and the attended image vectors $a_j^v$ to determine the relevance of each word 402 with respect to the image 102. Furthermore, the pooling process in the image-text formulation filtered out regions 302 of low importance, whereas the pooling process in the text-image formulation may filter out words 402 of low importance. Either formulation (i.e., image-text formulation or text-image formulation) may be used to compare images and sentences whether in the context of searching for images using a text query or in the context of searching for text using an image query.

In one implementation consistent with the text-image formulation of the present concepts, given the sentence T with n words and the image I with k detected regions, the first stage attention module 214 may compute a cosine similarity matrix for region-word pairs in the same way described above for the image-text formulation:

$$s_{i,j} = \frac{v_i^T e_j}{\|v_i\|\|e_j\|}, i \in [1, k], j \in [1, n]$$

The cosine similarity $s_{i,j}$ may be normalized:

$$\bar{s}'_{ij} = [s_{ij}]_+ / \sqrt{\sum_{j=1}^{n}[s_{ij}]_+^2}$$

In the first stage, the first stage attention module 214 may attend on the regions 302 with respect to each word 402 and generate an attended image vector $a_j^v$ with respect to the j-th word. The attended image vector $a_j^v$ may be defined as a weighted sum of region vectors $v_i$:

$$a_j^v = \sum_{i=1}^{k} \alpha'_{ij} v_i$$

where the weights $\alpha'_{ij}$ may be defined as a softmax function:

$$\alpha'_{ij} = \exp(\lambda_1 \bar{s}'_{i,j}) / \sum_{i=1}^{k} \exp(\lambda_1 \bar{s}'_{i,j})$$

In the second stage, the second stage attention module 216 may measure the relevance between the j-th word and the image 102 using the cosine similarity between the word vector $e_j$ and the attended image vector $a_j^v$ to calculate word-image relevance scores R':

$$R'(e_j, a_j^v) = (e_j^T a_j^v) / (\|e_j\|\|a_j^v\|)$$

Next, the pooling module 218 may calculate a sentence-image similarity score S' that indicates the similarity between the sentence T and the image I using, for example, a LogSumExp pooling function (LSE):

$$S'_{LSE}(T, I) = \log\left(\sum_{j=1}^{n} \exp(\lambda_2 R'(e_j, a_j^v))\right)^{(1/\lambda_2)}$$

Alternatively, an average pooling function (AVG) may be used by the pooling module 218 to summarize the word-image relevance scores R':

$$S'_{AVG}(T, I) = \frac{\sum_{j=1}^{n} R'(e_j, a_j^v)}{n}$$

Accordingly, the image-sentence similarity score S determined using the image-text formulation and the sentence-image similarity score S' determined using the text-image formulation are both measures of the similarity between the image I and the sentence T. Although the image-sentence similarity score S and the sentence image similarity score S' may be unlikely to have the exact same value even when comparing the same pair of image I and sentence T, the meaning of the similarity scores are the same: higher value means higher degree of similarity.

Consistent with some implementations of the present concepts, given the image 102 and the sentence 104 for comparison, the cross-modal attention model 208 may calculate both the image-sentence similarity score S using the image-text formulation and the sentence-image similarity score S' using the text-image formulation. The cross-modal attention model 208 may then calculate a composite similarity score based on, for example, an average or a maximum of the image-sentence similarity score S and the sentence-image similarity score S'.

Referring to FIG. 2 again, the cross-modal attention model 208 may output the similarity score (e.g., the image-sentence similarity score S, the sentence-image similarity score S', or a composite similarity score) to the search engine 204. The search engine 204 may repeat the above-described processes for each of the candidate images. That is, the cross-modal attention model 208 may calculate a similarity score associated with each of the candidate images. Then, the search engine 204 may determine that the candidate image with the highest similarity score is the most similar to the search query sentence 104 and thus is the best matching image. Based on this determination, the search engine 204 may return the search result image to the client application 202. In this example, the search result image returned by the search engine 204 to the client application 202 may be the image 102 shown in FIG. 1. The search result image may be displayed to the user who provided the search query sentence 104.

Consistent with some implementations, multiple search result images may be returned by the search engine 204 to the client application 202 to be displayed to the user. The multiple search result images may be those having the highest similarity scores among the candidate images. The multiple search result images may be sorted according to their similarity scores, and the similarity scores may be presented to the user numerically and/or graphically. Consistent with some implementations, the search engine 204 may determine that none of the candidate images sufficiently matches the search query sentence 104 (e.g., the similarity scores are below a certain threshold value), and the user may be informed via the client application 202 that the search yielded zero hits.

Example Process

Figure 7:
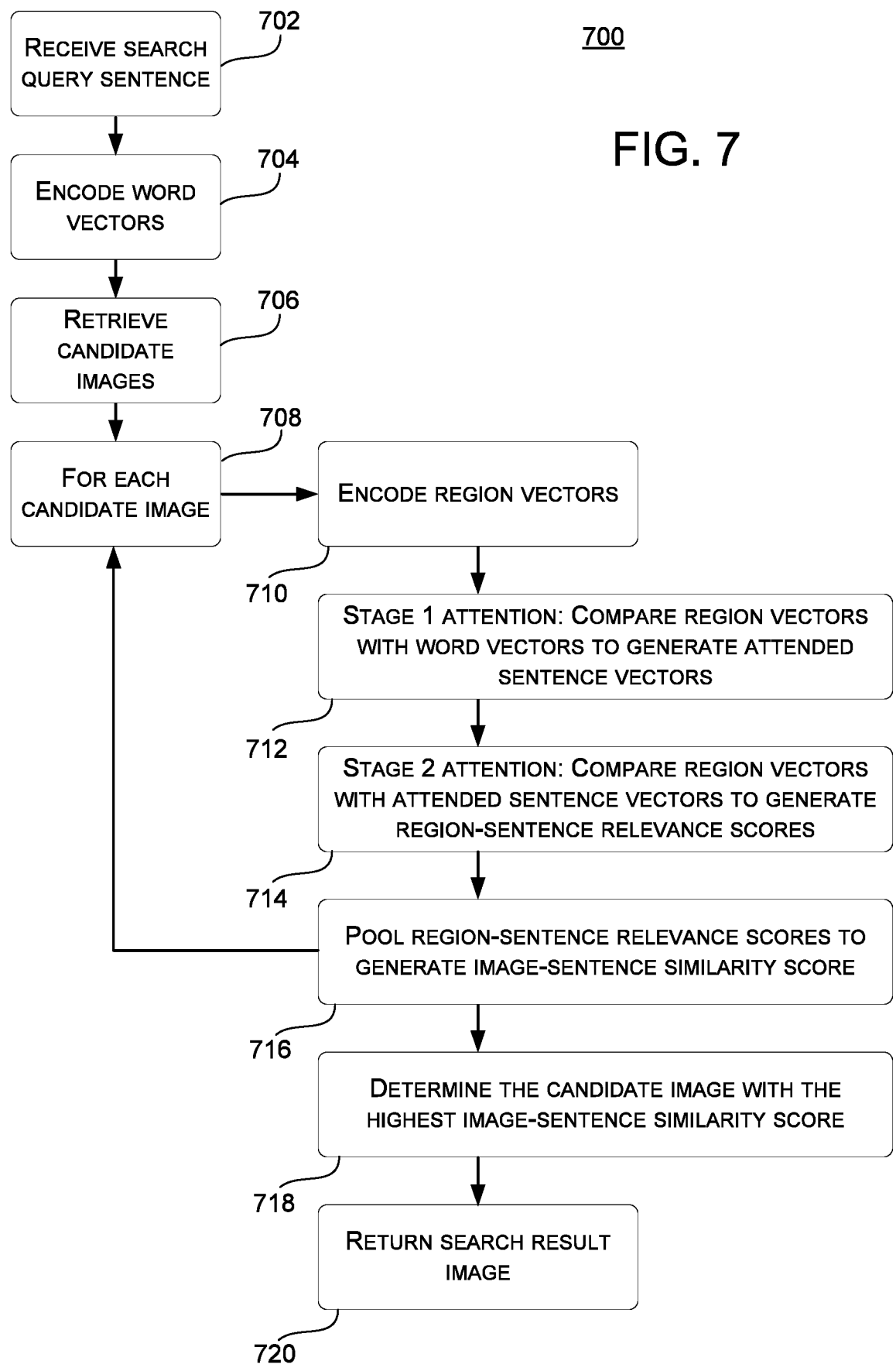
FIG. 7 shows a flow diagram illustrating an example two-stage cross-modal matching method, consistent with some implementations of the present concepts.

FIG. 7 shows a flow diagram illustrating an example two-stage cross-modal matching method 700, consistent with some implementations of the present concepts. In act 702, a search query sentence may be received. For example, a search engine in a server device may receive the search query sentence provided by a client application in a client device. The search query sentence may be provided by a user for the purpose of finding a matching image that corresponds to the search query sentence. In act 704, a set of word vectors may be encoded based on the search query sentence. For example, an RNN that has been trained using a corpus of matching image-text pairs may be used to generate the word vectors. In act 706, a plurality of candidate images may be retrieved. For example, a database may store candidate images, and the search engine may retrieve a certain set of candidate images for comparison with the search query sentence.

Next, the set of candidate images may be evaluated by comparing them to the search query sentence. For each candidate image 708, in act 710, a set of region vectors may be encoded based on the candidate image. This act 710 may involve detecting a plurality of regions in the candidate image. For example, a Faster R-CNN model may be used to detect regions in the candidate image and to generate the set of regions vectors.

In act 712, a first stage attention may be performed to attend on the words in the search query sentence and determine which words correspond to each of the regions. In this act 712, the set of region vectors may be compared with the set of word vectors to generate an attended sentence vector for each region. In one implementation, act 712 may involve computing a cosine similarity matrix by comparing every region-word pair.

In act 714, a second stage attention may be performed to attend on the regions in the candidate image and determine which regions are more relevant to the search query sentence. In this act 714, the set of region vectors may be compared with the associated attended sentence vectors to generate region-sentence relevance scores associated with the regions. In one implementation, act 714 may involve computing a cosine similarity between the region vector and the attended sentence vector to compute the region-similarity relevance score.

In act 716, the region-sentence relevance scores may be pooled to generate an image-sentence similarity score, which indicates the degree of similarity between the candidate image and the search query sentence. In one implementation, the image-sentence similarity score may be computed as an average of the region-sentence relevance scores.

Acts 712-716 have been described as being consistent with the image-text formulation explained above. Alternatively, acts 712-716 may be performed using the text-image formulation instead, where act 712 may attend first on the regions in the candidate image, and act 714 may attend second on the words in the search query sentence. Consistent with some implementations of the present concepts, acts 712-716 may be performed twice—once using the image-text formulation and again using the text-image formulation—and a composite similarity score may be computed based on the two formulations.

After acts 710-716 have been performed for a candidate image, acts 710-716 may be repeated for the next candidate image and so on, until all candidate images have been evaluated. By performing acts 710-716 for each candidate image 708, a similarity score will have been generated for each candidate image.

Next, in act 718, the candidate image with the highest similarity score may be determined as being the most similar to the search query sentence. And finally, in act 720, the best candidate image may be returned as the search result image.

Consistent with the present concepts, the two-stage cross-modal matching method 700 can be performed by the systems and/or elements described above and/or below, and/or by other devices and/or systems. The method 700, in part or in whole, can be implemented on many different types of devices, for example, by one or more servers; one or more client devices, such as a laptop, tablet, or smartphone; or combinations of servers and client devices. The order in which the acts in the method 700 are described is not intended to be construed as a limitation, and any number of the described acts can be combined in any order to implement the method 700, or alternate methods. Furthermore, the method 700 can be implemented in any suitable hardware, software, firmware, or combination thereof, such that a device can implement the method 700. In one case, the method 700 may be stored on one or more computer-readable storage media as a set of instructions (e.g., computer-readable instructions or computer-executable instructions) such that execution by a processor of a computing device causes the computing device to perform the method 700.

Generally, any of the functions described herein can be implemented using software, firmware, hardware (e.g., fixed-logic circuitry), or a combination of these implementations. The term "component" as used herein can generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component may be platform-independent, meaning that they may be implemented on a variety of commercial computing platforms having a variety of processing configurations.

Example System

Figure 8:
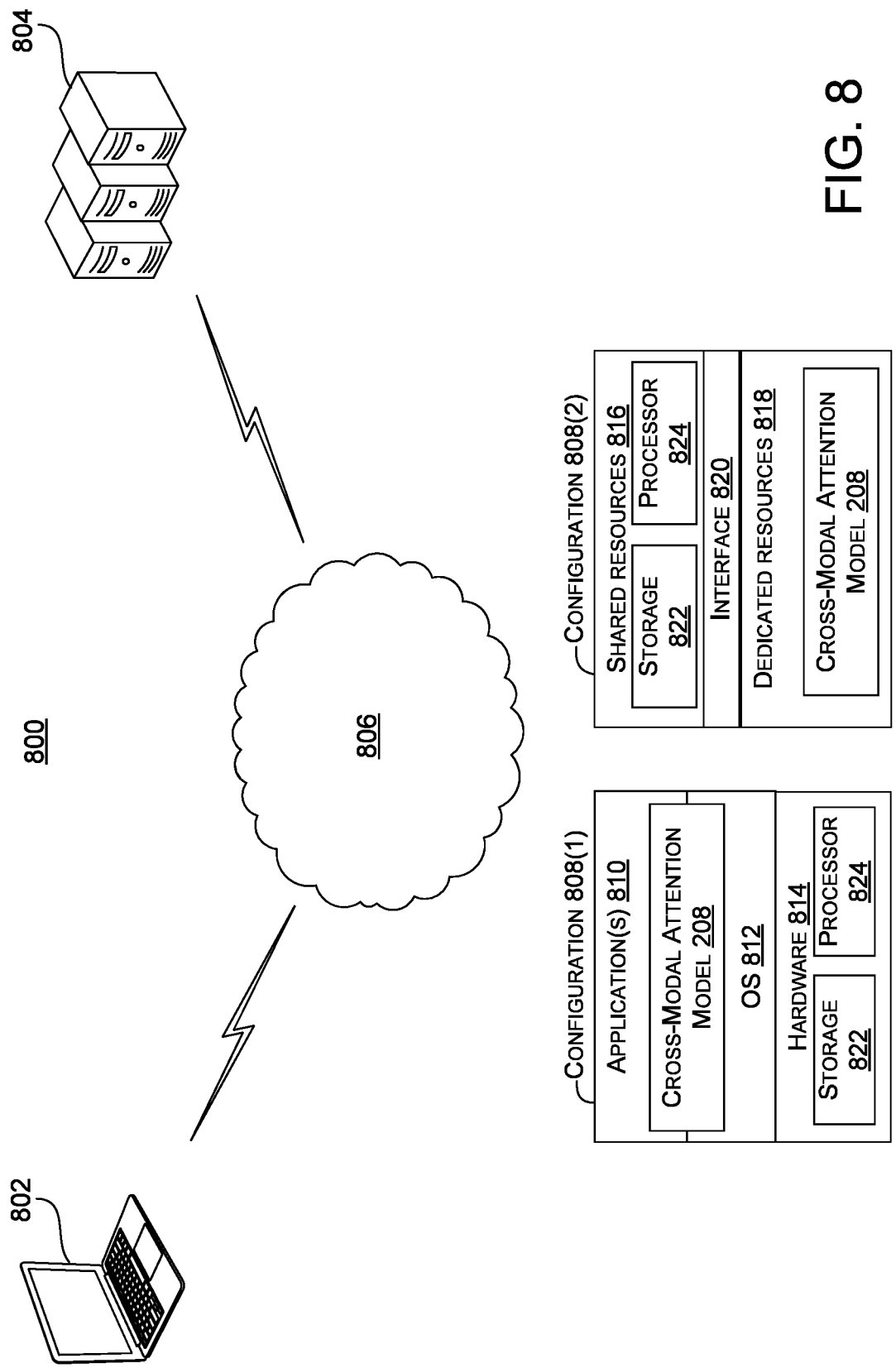
FIG. 8 illustrates an example system in which some implementations of the present concepts can be employed.

FIG. 8 illustrates an example system 800 in which some implementations of the present concepts can be employed. For purposes of explanation, the system 800 may include one or more client devices 802 and one or more server devices 804. In the illustrated example, the client device 802 may be a laptop computer. The number of devices and the type of devices described and depicted are intended to be illustrative and non-limiting. Examples of the devices 802 or 804 can include traditional computing devices, such as personal computers, desktop computers, servers, notebook computers, cell phones, smart phones, personal digital assistants, pad type computers, mobile computers, wearable devices, cameras, appliances, smart devices, IoT devices, vehicles, etc., and/or any of a myriad of ever-evolving or yet to be developed types of computing devices. The devices 802 and 804 may be controlled via one or more input controls, such as a keyboard, mouse, touchscreen, or voice command. The client devices 802 and the server devices 804 can communicate with one another via one or more networks 806. The network 806 may include an intranet and/or the Internet, and can be wired or wireless.

Each client device 802 and server device 804 may perform the two-stage cross-modal matching method 700 as a standalone device. Alternatively, any or all of the acts 702-720 in the two-stage cross-modal matching method 700 may be performed among a plurality of the client devices 802 and/or the server device 804. In one implementation, the client device 802 may include the client application 202 (not shown in FIG. 8), and the server device 804 may include the search engine 204 (not shown in FIG. 8), the database 206 (not shown in FIG. 8), and the cross-modal attention model 208. For example, the client device 802 may be a digital assistant that includes an Internet browser as the client application 202. The digital assistant may facilitate a search of images available on the Internet when a user input a query text into the Internet browser. That is, the Internet browser on the digital assistant may send the query text to the search engine 204 in the server device 804 to retrieve matching image(s) available on the Internet, where the cross-modal attention model 208 on the server device 804 compared candidate images with the query text using the present concepts.

One or more of the client devices 802 and the server devices 804 may perform various combinations of acts in the two-stage cross-modal matching method 700, depending on, for example, the processing and storage resources and the communication capabilities of the client devices 802 and the server devices 804. The specific examples of described implementations should not be viewed as limiting the present concepts.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include transitory propagating signals. In contrast, the term "computer-readable storage media" excludes transitory propagating signals. Computer-readable storage media include "computer-readable storage devices." Examples of computer-readable storage devices include volatile storage media, such as RAM, and non-volatile storage media, such as hard drives, optical discs, and flash memory, among others.

FIG. 8 shows two example device configurations 808(1) and 808(2) that can be employed by any or all of the client devices 802 and the server devices 804. The client devices 802 and the server devices 804 can employ either of the configurations 808(1) or 808(2), or an alternate configuration. One instance of each configuration 808 is illustrated in FIG. 8. The device configuration 808(1) may represent an operating system (OS) centric configuration. The device configuration 808(2) may represent a system-on-chip (SOC) configuration. The device configuration 808(1) can be organized into one or more applications 810, operating system 812, and hardware 814. The device configuration 808(2) may be organized into shared resources 816, dedicated resources 818, and an interface 820 therebetween.

In either configuration 808, the device 802 or 804 can include storage/memory 822 and a processor 824. The device 802 or 804 may also include other components that are not illustrated in FIG. 8, such as a battery (or other power source), a network communication component, and/or input-output components. The device 802 or 804 can also include the cross-modal attention model 208.

In the case of the device configuration 808(2), certain functionality provided by the device 802 or 804 can be integrated on a single SOC or multiple coupled SOCs. One or more processors 824 can be configured to coordinate with shared resources 816, such as storage/memory 822, etc., and/or one or more dedicated resources 818, such as hardware blocks configured to perform certain specific functionality. For example, one or more of the neural networks discussed above may be optimized and implemented on a field-programmable gate array (FPGA). Thus, the term "processor" as used herein can also refer to hardware processors, such as central processing units (CPUs), graphical processing units (GPUs), controllers, microcontrollers, processor cores, or other types of processing devices.

Other Applications

The present concepts are not limited to the specific scenarios and applications described above. The ability to generate a similarity score between data of two different modalities can be useful in a wide variety of contexts, such as determining whether first data and second data of different modalities match or determining which one of a plurality of candidate first data is the best match for second data.

Specifically, the present concepts have been described above in reference to FIG. 2 in the example scenario of comparing image modality data with text modality data in the context of searching for a matching image in response to a query text. However, the cross-modal attention model 208 may also be used in a different context of searching for a matching text in response to a query image. That is, the client application 202 may provide a search query image to the search engine 204, the search engine 204 may retrieve candidate sentences from the database 206, the cross-modal attention model 208 may compare the search query image with the candidate sentences, and the search engine 204 may return a search result sentence to the client application 202.

Furthermore, image modality data and text modality data may be compared in other applications besides the searching context. For example, the cross-modal attention model 208 may be used in conjunction with auto-captioning algorithms to evaluate the accuracy of automatically generated text captions of images.

Data of other modalities, including audio, speech, video, and foreign language, may be compared and matched, consistent with the present concepts. So long as the data can be encoded as a set of feature vectors representing the components of the data and there are sufficient ground truth data pairs to train the encoding models, the present concepts can be utilized to compare the data pairs of two different modalities and generate a similarity score. For example, speech data may be encoded as multiple vectors representing tones or phonemes.

Many other applications of the present concepts are possible. For instance, in the linguistics field, the performance of several machine translation engines may be evaluated by comparing text written in a source language with several candidate translations in a foreign language that were automatically generated by the machine translation engines using the present concepts. Available datasets of foreign language correspondences can be used to train neural networks for this type of endeavor. In the voice-recognition security field, a voice recording data of the speech modality may be compared with a set of candidate users using the present concepts to determine the best-matching user. In the transportation field, images and/or videos of an environment captured by sensors of a self-driving vehicle may be matched by the present concepts with candidate text captions that identify the objects and features in the environment. In the medical field, the present concepts can be used to match image scans of patients (e.g., x-rays, MRI images, CAT scans, tissue biopsy images, etc.) with candidate text of various diseases and disorders. In the defense field, satellite images of military arsenal (e.g., aircrafts, tanks, rockets, etc.), radar signatures of aircrafts, or sonar signatures of ships and submarines may be identified by matching such data with candidate text identifications using the present concepts.

It should be apparent that the present concepts have incredibly wide and diverse applications. The concepts described here can be extended and applied to any field where a signal containing data of any modality can be encoded into a set of vectors based on the components of the data. Regardless of the particular modalities being compared, the present concepts can greatly improve the accuracy of comparing two data pairs by employing the stacked two-stage attention processes using one or both formulations to attend to the components of the data pairs.

CONCLUSION

Although the subject matter has been described in language specific to structural features and/or methodological acts, the subject matter defined in the appended claims is not necessarily limited to the specific features or acts described above. Rather, the specific features and acts described above are disclosed as example forms of implementing the claims, and other features and acts that would be recognized by one skilled in the art are intended to be within the scope of the claims.

Various device examples are described above. Additional examples are described below. One example includes a system comprising a first neural network for detecting a plurality of regions in an image, a second neural network for generating a plurality of region vectors associated with the plurality of regions, and a third neural network for generating a plurality of word vectors associated with a plurality of words in a sentence. The system also comprises one or more storage resources storing the first neural network, the second neural network, and the third neural network; and a search engine receiving the image as a search query and returning the sentence as a search result. The system also comprises one or more hardware processors and at least one computer-readable storage medium storing computer-readable instructions which, when executed by the one or more hardware processors, cause the one or more hardware processors to: detect the plurality of regions based at least on the image using the first neural network, generate the plurality of region vectors based at least on the plurality of regions using the second neural network, generate the plurality of word vectors based at least on the sentence using the third neural network, generate a plurality of attended sentence vectors associated with the plurality of region vectors based at least on a comparison between the plurality of region vectors and the plurality of word vectors, generate a plurality of region-sentence relevance scores associated with the plurality of region vectors based at least on a comparison between the plurality of region vectors and the plurality of attended sentence vectors, generate an image-sentence similarity score indicating a similarity between the image and the sentence based at least on the plurality of region-sentence relevance scores, the search engine returning the sentence based at least on the image-sentence similarity score.

Another example can include any of the above and/or below examples where the computer-readable instructions further cause the one or more hardware processors to train at least one of the second neural network or the third neural network using at least a plurality of matching image-sentence pairs.

Another example can include any of the above and/or below examples where the computer-readable instructions further cause the one or more hardware processors to compute a cosine similarity matrix based at least on the plurality of region vectors and the plurality of word vectors to generate the plurality of attended sentence vectors.

Another example can include any of the above and/or below examples where the computer-readable instructions further cause the one or more hardware processors to compute cosine similarities between the plurality of region vectors and the plurality of attended sentence vectors to generate the plurality of region-sentence relevance scores Another example can include any of the above and/or below examples where the computer-readable instructions further cause the one or more hardware processors to compute an average of the plurality of region-sentence relevance scores to generate the image-sentence similarity score Another example includes a method comprising receiving a sentence including a plurality of words as a search query, retrieving an image as a candidate search result, inputting the image into a first neural network to detect a plurality of regions in the image, inputting the plurality of regions into a second neural network to generate a plurality of region vectors, and inputting the sentence into a third neural network to generate a plurality of word vectors. The method also comprises comparing the plurality of region vectors with the plurality of word vectors to generate a plurality of attended sentence vectors, comparing the plurality of region vectors with the plurality of attended sentence vectors to generate a plurality of region-sentence relevance scores indicating correspondence between the plurality of regions and the sentence, pooling the plurality of region-sentence relevance scores to generate an image-sentence similarity score indicating correspondence between the image and the sentence, and outputting the image as a search result based at least on the image-sentence similarity score.

Another example can include any of the above and/or below examples where the method further comprises training at least one of the second neural network or the third neural network using at least a plurality of matching image-sentence pairs.

Another example can include any of the above and/or below examples where the method further comprises training at least one of the second neural network or the third neural network using at least a plurality of mismatching image-sentence pairs.

Another example can include any of the above and/or below examples where the second neural network is a convolutional neural network.

Another example can include any of the above and/or below examples where the third neural network is a recurrent neural network.

Another example can include any of the above and/or below examples where the comparing of the plurality of region vectors with the plurality of word vectors comprises computing a cosine similarity matrix.

Another example can include any of the above and/or below examples where the plurality of attended sentence vectors are generated based at least on weighted sums of the plurality of word vectors.

Another example can include any of the above and/or below examples where the plurality of region-sentence relevance scores are generated based at least on cosine similarities between the plurality of region vectors and the plurality of attended sentence vectors.

Another example can include any of the above and/or below examples where the pooling of the plurality of region-sentence relevance scores comprises using a LogSumExp function on the plurality of region-sentence relevance scores.

Another example can include any of the above and/or below examples where the pooling of the plurality of region-sentence relevance scores comprises computing a maximum of the plurality of region-sentence relevance scores.

Another example can include any of the above and/or below examples where the plurality of region vectors, the plurality of word vectors, and the plurality of attended sentence vectors map to a common semantic vector space.

Another example can include any of the above and/or below examples where the method further comprises comparing the plurality of word vectors with the plurality of region vectors to generate a plurality of attended image vectors, comparing the plurality of word vectors with the plurality of attended image vectors to generate a plurality of word-image relevance scores indicating correspondence between the plurality of words and the image, pooling the plurality of word-image relevance scores to generate a sentence-image similarity score indicating correspondence between the sentence and the image, and generating a composite similarity score based at least on the image-sentence similarity score and the sentence-image similarity score, where the outputting of the image as the search result is based at least on the composite similarity score.

Another example can include any of the above and/or below examples where the method further comprises generating a plurality of image-sentence similarity scores for a plurality of candidate images, the image being one of the plurality of candidate images, where the outputting of the image as the search result is based at least on the image-sentence similarity score of the image being the highest among the plurality of image-sentence similarity scores.

Another example includes a method comprising receiving first data of a first modality as a search query over a network from a client device, retrieving second data of a second modality that is distinct from the first modality, encoding a plurality of first vectors representing the first data using at least a first neural network, and encoding a plurality of second vectors representing the second data using at least a second neural network. The method also comprises comparing the plurality of first vectors with the plurality of second vectors to generate a plurality of attended vectors associated with the plurality of first vectors, comparing the plurality of first vectors with the plurality of attended vectors to generate a plurality of relevance scores associated with plurality of first vectors, pooling the plurality of relevance scores to generate a similarity score indicating similarity between the first data and the second data, and sending the second data over the network to the client device as a search result, the search result being based at least on the similarity score.

Another example can include any of the above and/or below examples where the first modality and the second modality are different ones of: text, foreign language, speech, audio, image, or video.

The invention claimed is:

1. A system, comprising:
   a first neural network for detecting a plurality of regions in an image;
   a second neural network for generating a plurality of region vectors associated with the plurality of regions;
   a third neural network for generating a plurality of word vectors associated with a plurality of words in a sentence;
   one or more storage resources storing the first neural network, the second neural network, and the third neural network;
   a search engine receiving the image as a search query and returning the sentence as a search result;
   one or more hardware processors; and
   at least one computer-readable storage medium storing computer-readable instructions which, when executed by the one or more hardware processors, cause the one or more hardware processors to:
      detect the plurality of regions based at least on the image using the first neural network;
      generate the plurality of region vectors based at least on the plurality of regions using the second neural network;
      generate the plurality of word vectors based at least on the sentence using the third neural network;
      generate a plurality of attended sentence vectors associated with the plurality of region vectors based at least on a comparison between the plurality of region vectors and the plurality of word vectors, the plurality of attended sentence vectors including weights indicating correspondence between the plurality of regions and the plurality of words;
      generate a plurality of region-sentence relevance scores associated with the plurality of region vectors based at least on a comparison between the plurality of region vectors and the plurality of attended sentence vectors, the plurality of region-sentence relevance scores indicating relevance of the plurality of regions with respect to the sentence; and
      generate an image-sentence similarity score indicating a similarity between the image and the sentence based at least on the plurality of region-sentence relevance scores, the search engine returning the sentence based at least on the image-sentence similarity score.

2. The system of claim 1, wherein the computer-readable instructions further cause the one or more hardware processors to:
   train at least one of the second neural network or the third neural network using at least a plurality of matching image-sentence pairs.

3. The system of claim 1, wherein the computer-readable instructions further cause the one or more hardware processors to:
   compute a cosine similarity matrix based at least on the plurality of region vectors and the plurality of word vectors to generate the plurality of attended sentence vectors.

4. The system of claim 1, wherein the computer-readable instructions further cause the one or more hardware processors to:
   compute cosine similarities between the plurality of region vectors and the plurality of attended sentence vectors to generate the plurality of region-sentence relevance scores.

5. The system of claim 1, wherein the computer-readable instructions further cause the one or more hardware processors to:
   compute an average of the plurality of region-sentence relevance scores to generate the image-sentence similarity score.

6. A method, comprising:
   receiving a sentence including a plurality of words as a search query;
   retrieving an image as a candidate search result;

inputting the image into a first neural network to detect a plurality of regions in the image;

inputting the plurality of regions into a second neural network to generate a plurality of region vectors;

inputting the sentence into a third neural network to generate a plurality of word vectors;

comparing the plurality of region vectors with the plurality of word vectors to generate a plurality of attended sentence vectors, the plurality of attended sentence vectors indicating correspondence between the plurality of regions and the plurality of words;

comparing the plurality of region vectors with the plurality of attended sentence vectors to generate a plurality of region-sentence relevance scores indicating correspondence between the plurality of regions and the sentence;

pooling the plurality of region-sentence relevance scores to generate an image-sentence similarity score indicating correspondence between the image and the sentence; and outputting the image as a search result based at least on the image-sentence similarity score.

7. The method of claim 6, further comprising:
training at least one of the second neural network or the third neural network using at least a plurality of matching image-sentence pairs.

8. The method of claim 7, further comprising:
training at least one of the second neural network or the third neural network using at least a plurality of mismatching image-sentence pairs.

9. The method of claim 6, wherein the second neural network is a convolutional neural network.

10. The method of claim 6, wherein the third neural network is a recurrent neural network.

11. The method of claim 6, wherein the comparing of the plurality of region vectors with the plurality of word vectors comprises computing a cosine similarity matrix.

12. The method of claim 6, wherein the plurality of attended sentence vectors are generated based at least on weighted sums of the plurality of word vectors.

13. The method of claim 6, wherein the plurality of region-sentence relevance scores are generated based at least on cosine similarities between the plurality of region vectors and the plurality of attended sentence vectors.

14. The method of claim 6, wherein the pooling of the plurality of region-sentence relevance scores comprises using a LogSumExp function on the plurality of region-sentence relevance scores.

15. The method of claim 6, wherein the pooling of the plurality of region-sentence relevance scores comprises computing a maximum of the plurality of region-sentence relevance scores.

16. The method of claim 6, wherein the plurality of region vectors, the plurality of word vectors, and the plurality of attended sentence vectors map to a common semantic vector space.

17. The method of claim 6, further comprising:
comparing the plurality of word vectors with the plurality of region vectors to generate a plurality of attended image vectors;

comparing the plurality of word vectors with the plurality of attended image vectors to generate a plurality of word-image relevance scores indicating correspondence between the plurality of words and the image;

pooling the plurality of word-image relevance scores to generate a sentence-image similarity score indicating correspondence between the sentence and the image; and generating a composite similarity score based at least on the image-sentence similarity score and the sentence-image similarity score, wherein the outputting of the image as the search result is based at least on the composite similarity score.

18. The method of claim 6, further comprising:
generating a plurality of image-sentence similarity scores for a plurality of candidate images, the image being one of the plurality of candidate images, wherein the outputting of the image as the search result is based at least on the image-sentence similarity score of the image being the highest among the plurality of image-sentence similarity scores.

19. A method, comprising:
receiving first data of a first modality as a search query over a network from a client device;

retrieving second data of a second modality that is distinct from the first modality;

encoding a plurality of first vectors representing the first data using at least a first neural network;

encoding a plurality of second vectors representing the second data using at least a second neural network;

comparing the plurality of first vectors with the plurality of second vectors to generate a plurality of attended vectors associated with the plurality of first vectors;

comparing the plurality of first vectors with the plurality of attended vectors to generate a plurality of relevance scores associated with plurality of first vectors;

pooling the plurality of relevance scores to generate a similarity score indicating similarity between the first data and the second data; and sending the second data over the network to the client device as a search result, the search result being based at least on the similarity score.

20. The method of claim 19, wherein the first modality and the second modality are different ones of: text, foreign language, speech, audio, image, or video.

* * * * *